United States Patent

Jantzen

[15] 3,645,549
[45] Feb. 29, 1972

[54] AUTOMATIC BELT RETRACTOR
[72] Inventor: George H. Jantzen, Bronx, N.Y.
[73] Assignee: M. Steinthal and Company, Inc., New York, N.Y.
[22] Filed: June 23, 1969
[21] Appl. No.: 835,345

[52] U.S. Cl..........................297/388, 280/150 SB, 297/389
[51] Int. Cl.................B60r 21/10, A62b 35/82, A47d 15/00
[58] Field of Search...........297/388, 389; 242/107.2, 107.4; 280/150

[56] References Cited

UNITED STATES PATENTS

| | | | |
|---|---|---|---|
| 2,937,882 | 5/1960 | Oppenheim | 280/150 SB |
| 3,184,267 | 5/1965 | Rumble | 297/388 |
| 3,199,918 | 8/1965 | Nakolan | 297/388 |
| 3,147,996 | 9/1964 | Ferrara et al. | 297/388 |
| 3,439,933 | 4/1969 | Jantzen | 280/150 |
| 3,447,833 | 6/1969 | Rice | 297/389 X |
| 3,486,792 | 12/1969 | Stoffel | 297/388 |

Primary Examiner—Casmir A. Nunberg
Attorney—Milton Robert Kestenbaum

[57] ABSTRACT

An elongated retractor serves as a guide for a retracting slide within it. When the belt is fully extracted, the slide is pulled to a position where it engages a pivotable locking member and is locked against retracting the belt. A cable is arranged to push or pull the locking member about its pivot axis out of engagement. A spring holds the locking member in position for engagement when the cable is not actuated.

20 Claims, 17 Drawing Figures

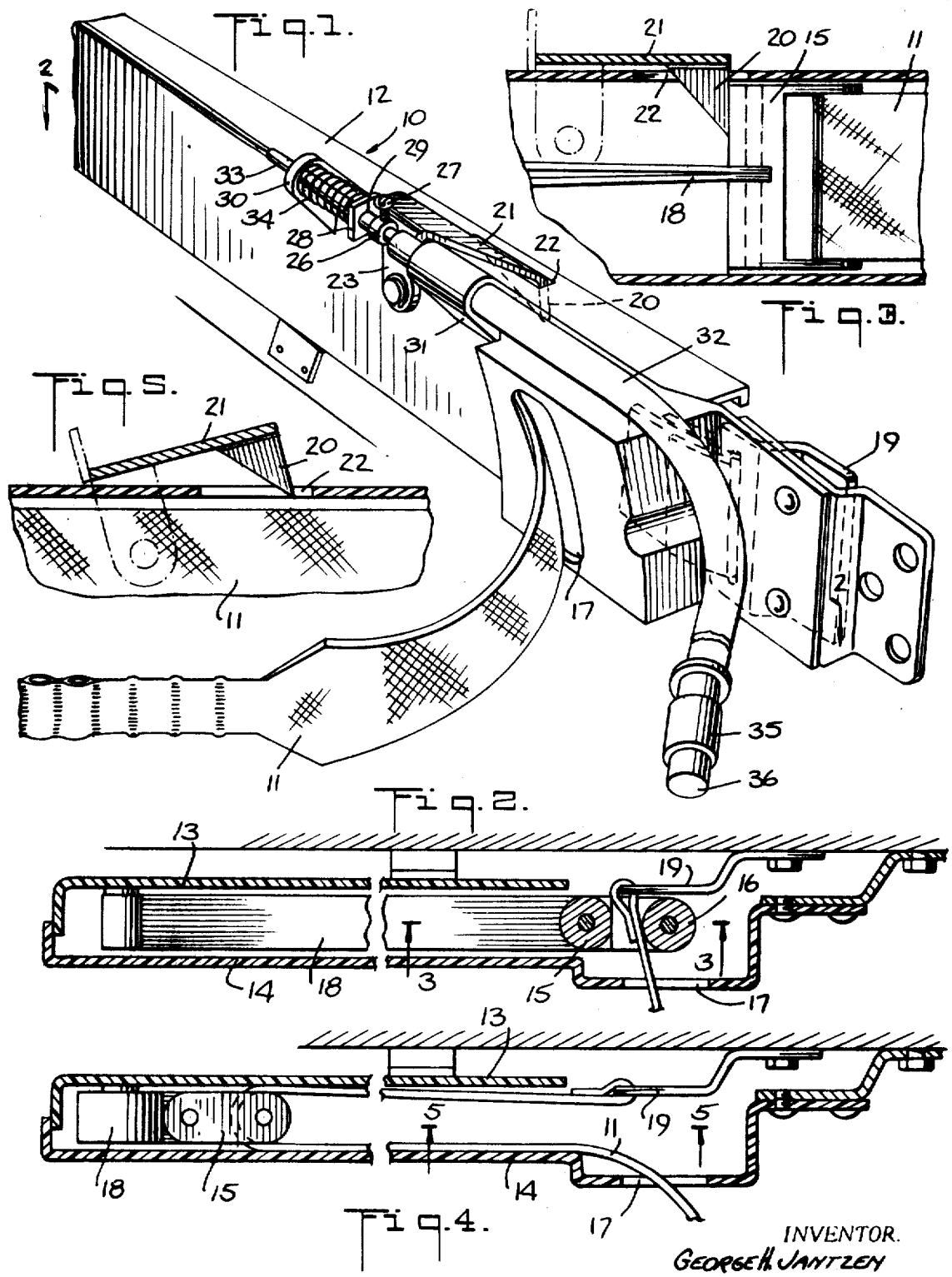

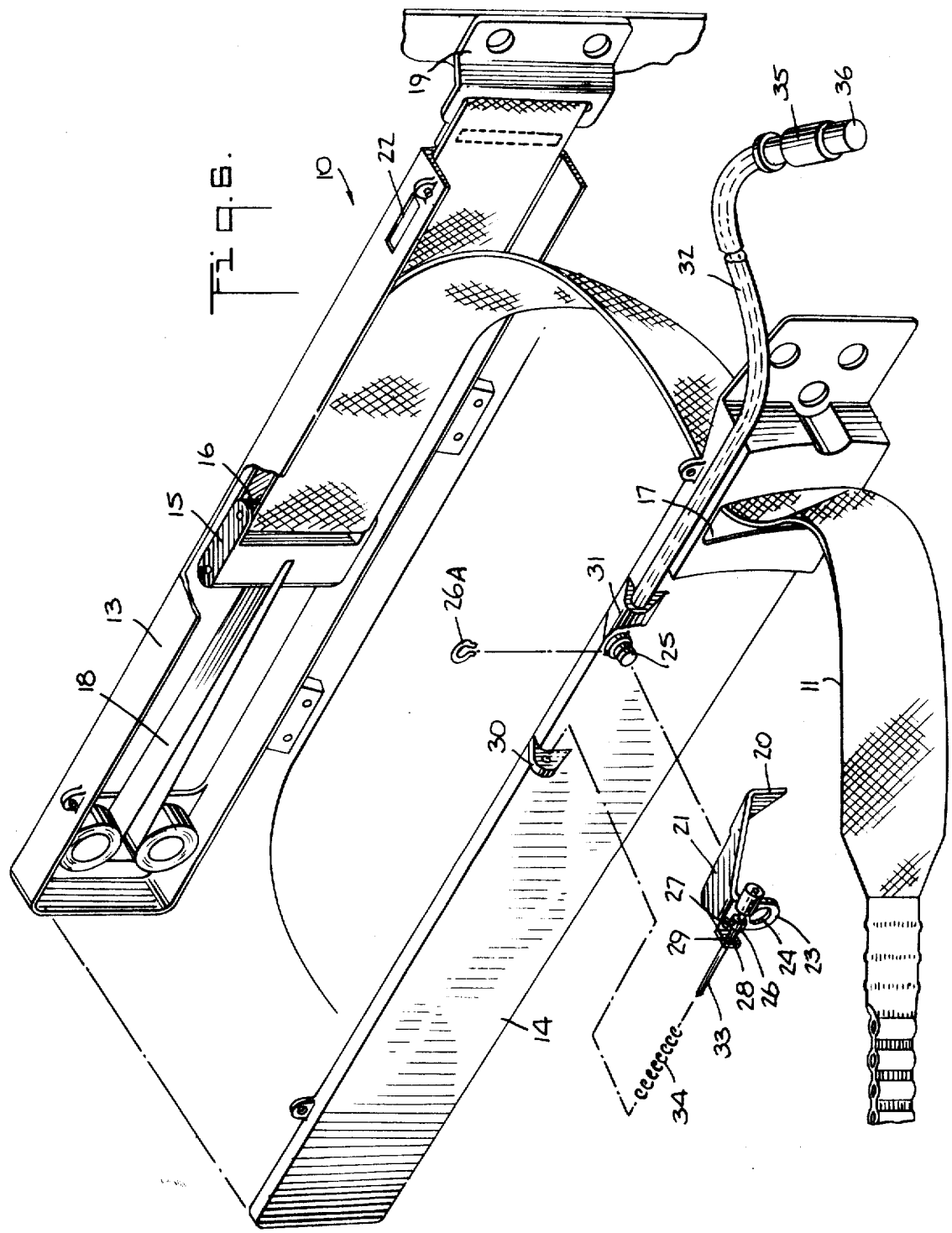

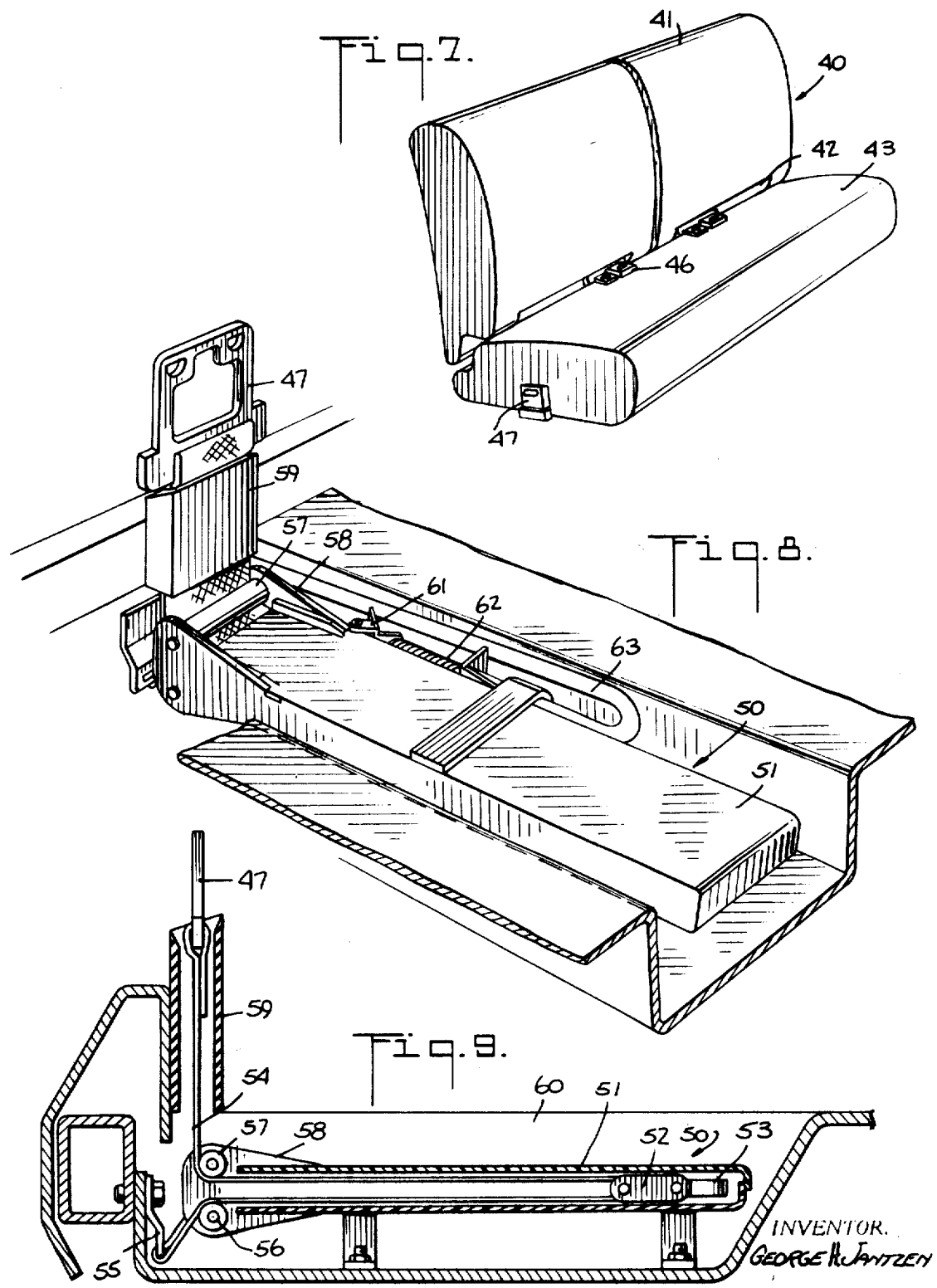

Patented Feb. 29, 1972 3,645,549
6 Sheets-Sheet 4
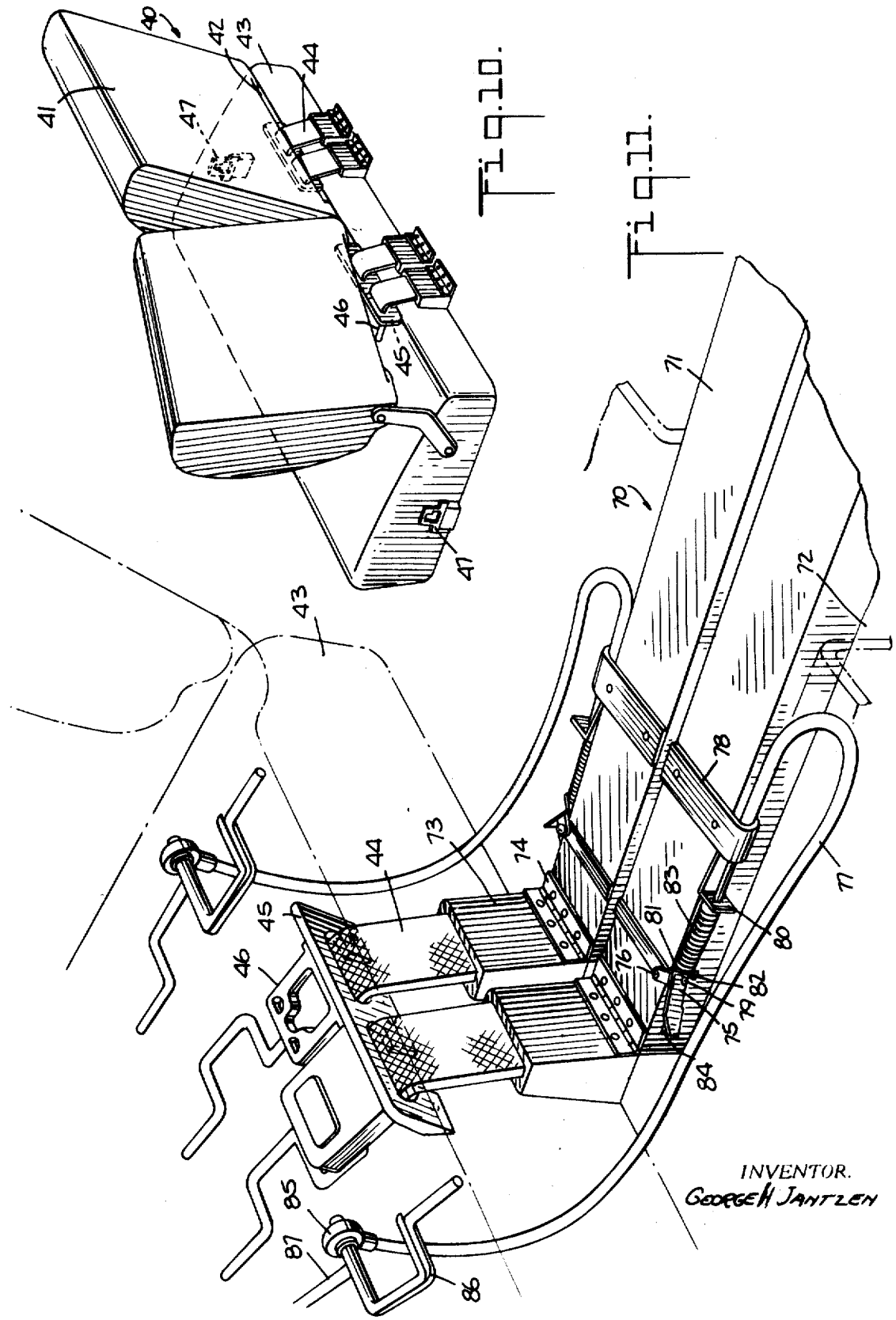
INVENTOR.
GEORGE H JANTZEN

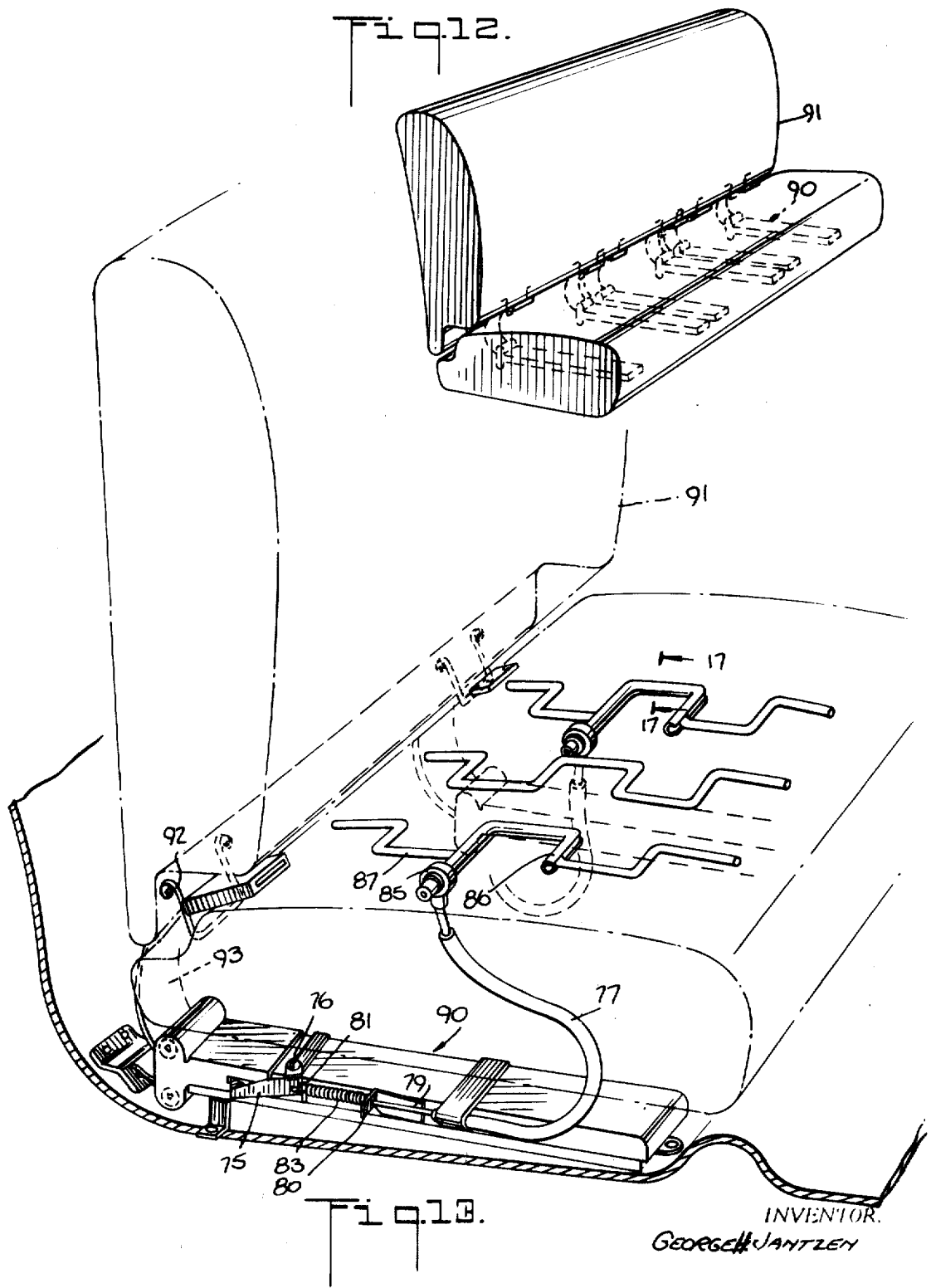

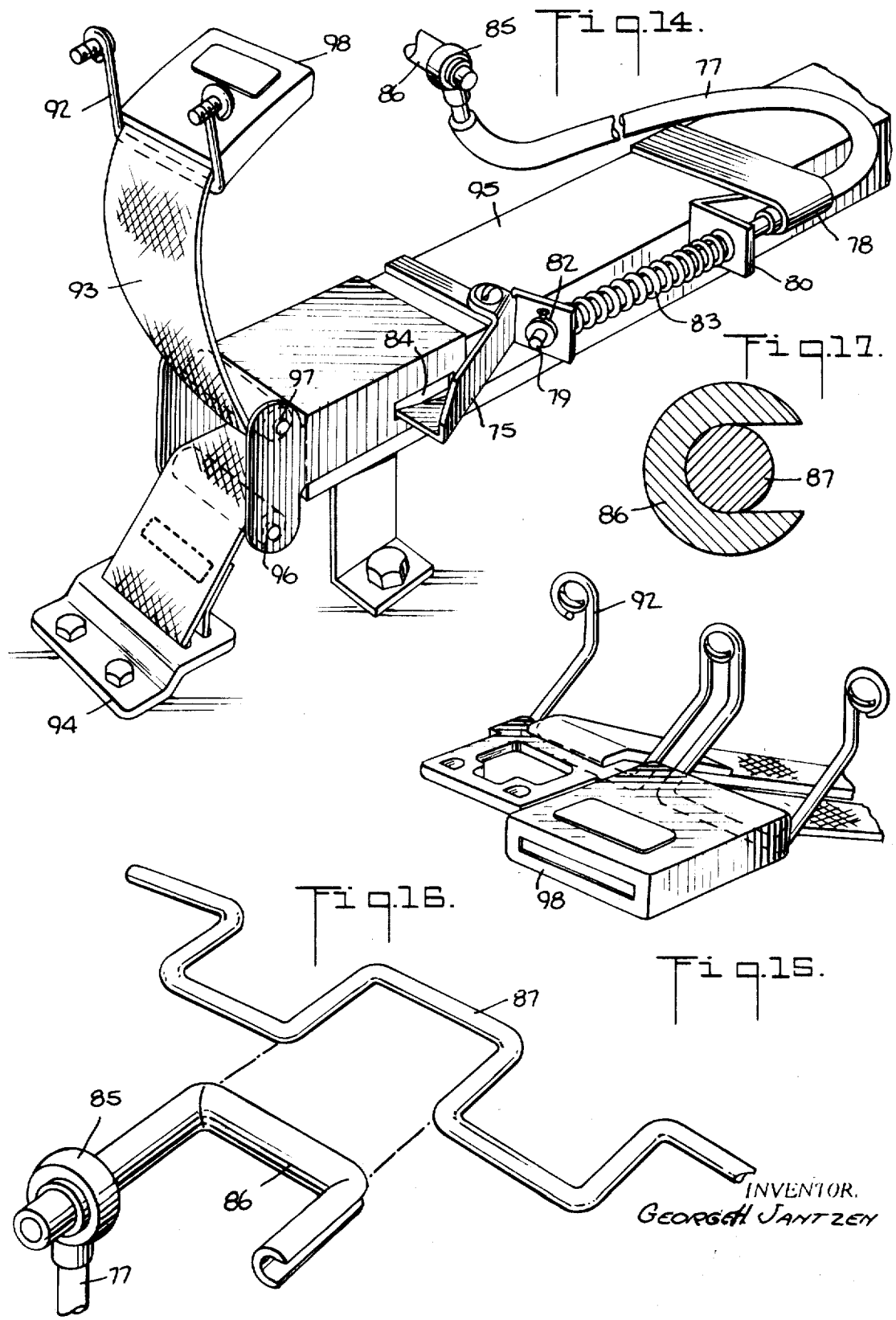

AUTOMATIC BELT RETRACTOR

This invention relates to seatbelt retractors and more particularly to self-locking retractor devices for vehicles.

In U.S. Pat. No. 3,439,933, I have disclosed a shoulder harness retractor which is positioned behind the headliner of a vehicle, above and to the rear of the seat it serves. The retractor employs an elongated boxlike housing which serves as a guide for a slide within it and a place into which the slide can retract the belt doubled over. When the belt is fully extracted, the slide is pulled to a position within the housing where it engages a locking member and is locked against retracting the belt. The locking member is actuated to release the slide by pressing against it through a button fastened on the headliner. As a result, the shoulder harness can be retracted out of the vehicle interior when not in use.

It has now been found that if remotely operable means were devised for releasing the slide from the locking member, the elongated self-locking retractor of the type described would provide a most effective automatic retractor for both inboard and outboard belt halves for the front and rear seats of a passenger vehicle. Similarly, a remotely operable means would greatly enhance the performance of the shoulder harness retractor by enabling release of the locking member by a button on the dashboard convenient to the user.

Accordingly, it is an object of this invention to provide a basic design for an efficient and effective automatic retractor for seatbelts and shoulder harnesses.

A further object of the invention is to provide a belt retractor of the elongated self-locking type in which the locking member is actuated by remotely operable means.

Another object of this invention is to provide a seatbelt retractor of the self-locking type, in which the belt is automatically released for retraction through the operation of remotely operable means.

A further object of this invention is to provide a cable means which releases a belt retractor upon the removal of the passenger from the vehicle seat.

These objects are accomplished in the present invention through the use of an elongated retractor and a cable which is arranged to pull or push a pivotable locking member about its pivot axis. The locking portion of the member is drawn out of the path of the retractor slide at the forward end of the retractor housing to release the slide for retraction. A helical compression spring is maintained in position about the cable to bear against the pivotable locking member to resist the action of the cable. When the cable is not actuated, the helical spring holds the locking member in the path of the slide to lock the slide when in the fully extracted position.

In one embodiment, the cable is secured at its remote end through a journaled means to the seat spring so as to draw the locking member out of the slide path when the passenger leaves the seat and the spring rises. In another embodiment, the remote end of the cable terminates at a pushbutton on the vehicle dashboard. When the button is pressed by the passenger, the cable draws the locking member out of the slide path, releasing the slide to retract a shoulder harness upwards into the elongated retractor positioned behind the headliner.

These and other objects and features of the invention will be made clear from the following detailed specifications and accompanying drawings in which:

FIG. 1 is a perspective view of a shoulder harness retractor according to the invention, FIG. 2 is a partial longitudinal sectional view taken along lines 2—2 in FIG. 1, with the belt extracted from the retractor, FIG. 3 is a sectional view along lines 3—3 in FIG. 2 showing the engagement of the locking member and the slide, FIG. 4 is a view similar to FIG. 2, with the belt retracted, FIG. 5 is a sectional view along the lines 5—5 in FIG. 4, showing the locking member out of the path of the slide, FIG. 6 is an exploded view of the shoulder harness retractor as shown in FIG. 1, FIG. 7 is a perspective view of a split front seat customary for a two door automobile and adapted according to the present invention, FIG. 8 is a perspective view of an outboard retractor according to the invention for the front seat shown in FIG. 7, FIG. 9 is a longitudinal sectional view of the retractor shown in FIG. 8, FIG. 10 is a perspective view from the rear of the front seat shown in FIG. 7, FIG. 11 is a perspective view of the inboard retractors according to the invention for the front seat shown in FIG. 10, FIG. 12 is a perspective view of a rear seat for an automobile adopted according to the present invention, FIG. 13 is an enlarged view of the perspective in FIG. 12 showing a rear seat retractor according to the invention, FIG. 14 is a perspective view of the rear seat retractor in FIG. 13, FIG. 15 is a perspective view of a bracket for retaining the belt buckles on the rear seat, FIG. 16 is a perspective view of a slotted sleeve for attaching a cable to a seat spring for operating the retractor, and FIG. 17 is a sectional view of the sleeve fitted on the seat spring taken along lines 17—17 in FIG. 13.

Referring to FIGS. 1 and 6, a belt retractor according to the invention is designated generally as 10 and is arranged for retracting a shoulder harness belt 11 into a housing 12 which is positioned above and somewhat to the rear of the seat it serves and behind the vehicle headliner. The housing is formed of a track 13 and a cover 14 which between them provide a guide for a slide 15 which moves reciprocally within the housing. The slide 15 has a roller 16 which engages the belt 11 and pulls it into the housing 12 as the slide moves towards the end of the housing remote from its slotted opening 17. The belt enters the housing through slotted opening 17. The slide 15 is biased towards the remote end of the housing 12 by constant tension spiral springs 18 which are fixed at the remote end and have their free ends secured to the slide 15.

The belt 11 is secured at one end to an anchor 19 which in turn is secured to a rigid structural portion of the vehicle above the side windows.

Referring to FIG. 2, when the belt 11 is fully extracted from the retractor, the belt runs straight from the anchor 19 through the slot 17 and the slide 15 is pulled to the right as shown to a predetermined position aligned between the anchor 19 and the slot 17. In this predetermined position, the tab portion 20 of a pivotable lever arm 21 drops into the path of the slide through a slot 22 in the housing as shown in FIG. 3. The spring 18 is rendered inoperative for drawing the slide 15 to retract the belt.

The lever arm 21, or locking member, has a tab 23 parallel to and offset from the locking tab 20. The hole 24 in tab 23 is fitted on a grooved stud 25 on the retractor cover 14 and is retained in place by a snap ring 26A which seats in the stud groove. The stud 25 is perpendicular to the plane of the path of movement of the slide 15 and hence is normal to the surface plane of the webbing of the belt 11. Tab 23 has an upended collar 26 attached to its face at a distance from its pivot axis. A screw 27 enters the collar through a threaded hole in its wall. The tab 23 also has a tab 28 with a hole 29 aligned with the collar 26. When the lever arm is assembled to the cover, the hole 29 and the collar 26 are positioned between and aligned with a pair of holes in spaced lugs 30 and 31 which extend from the edge of the housing cover 14.

A cable sleeve 32 has one end fitted in the lug 31. A cable 33, movable in the sleeve, extends through the collar 26 the hole 29 in tab 28 and the lug 30. The screw 27 is tightened to fix the cable 33 to the tab 23. A helical compression spring 34 is positioned around the extending portion of cable 33 to bear against the lug 30 and the tab 28 so as to continuously urge the tab 28 towards the right as shown. This spring force serves to bias the lever arm 21 for pivotal movement into a position in the path of slide 15.

The cable sleeve 32 and the cable 33 within it extend from the retractor to the dashboard of the vehicle. At this remote end a button fitting 35 is attached to the sleeve.

Assume the retractor is in the extracted and lock condition shown in FIGS. 2 and 3. When the button 36, remote from the locking lever arm 21, is pressed by the wearer, the cable 33 is pushed towards the left as shown. The lever arm 21 is fixed to the cable at the collar 26 and a push from the right which overcomes the force of helical spring 34 will pivot the lever arm 21 and its locking tab 20 out of slot 22 and out of engagement with the slide 15, as shown in FIG. 5. The constant tension spiral springs 18 are now free to draw the slide 15 and the belt 11 is retracted doubled into the elongated retractor housing 12 for storage, as shown in FIG. 4.

Referring now to FIGS. 7 and 10, a split front seat 40 is shown of the type customary for a two-door automobile. The backrests 41 each has a transverse cutout 42 at the base. These cutouts provide an adequate clearance between the seat cushion 43 and the backrest 41 to permit easy passage and retraction of the inboard belt webbings 44 into inboard retractors according to the invention. A slotted bracket 45 is secured in the cutout at the rear of the cushion to retain the buckle members 46 on the seat. Along each side of the seat, outboard buckle members 47 are positioned by the outboard seat belt retractors according to the invention.

Referring to FIGS. 8 and 9, the outboard front seat belt retractor, shown generally as 50, is comprised of an elongated rectangular boxlike housing 51 having a slide 52 within, biased for movement towards a constant tension spring 53, in a manner similar to the shoulder harness retractor described above. The seatbelt 54 is secured at one end to an anchor 55 which in turn is fastened to a structural member of the vehicle. The belt passes against rollers 56, 57 upon entering and exiting the flanged open end 58 of the retractor housing 51 and terminates at its free end at buckle member 47 which is held in position at the side of the seat by a sleeve 59.

The retractor 50 is positioned beneath the seat laterally with respect to the direction of the seat. The retractor is positioned below the floor level of the vehicle in a laterally oriented channel 60. Pivotably attached to the housing 51 is a pivotable locking lever arm 61, biased by a helical spring 62 and operably connected by a cable within a cable sleeve 63. Operation of the locking lever arm 61 is similar to the corresponding lever arm on the inboard retractor which will now be described with reference to FIG. 11.

The inboard retractor, shown generally as 70 is constructed of an elongated rectangular housing 71 having an internal belt-engaging slide biased for retraction by a constant tension spring, similar to the outboard retractor. The inboard retractors are located below floor level in longitudinally oriented channels 72. These channels are of course covered over in normal use.

The inboard seat belt 44 is served up to the front seat through a sleeve 73. Because the retractor 70 is fixed in position while the front seat moves longitudinally forward and backward, the sleeve 73 is hinged to the top of the housing 71 by the hinge 74.

A locking lever arm 75 is pivotably connected to the housing 71 by a screw 76 which provides a substantially normal pivot axis to the plane of the path of movement of the slide and to the surface of the webbing of the belt 44 within the housing 71. A cable sleeve 77 terminates in a bracket 78 which supports it and is in turn secured to the housing 71. The cable 79 extends beyond the sleeve through an apertured tab 80 on the bracket and through an aligned apertured tab 81 on the lever arm. A separate collar 82 holds the cable 79 from being withdrawn from the lever arm tab 81. A helical compression spring 83 is positioned around the cable and seats against the bracket tab 80 and the lever arm tab 81 to bias the lever arm for pivotal movement towards the housing and into the slot 84 in the housing where a locking tab on the lever arm will be in position to engage the slide when the belt is fully extracted. The slide will then be locked against retracting the belt.

The cable sleeve 77 and the cable 79 within it extend in the channel 72 up under the front seat and terminate at their ends remote from the retractor at a bearing collar 85 having journaled within it an extending portion of a slotted sleeve 86 which is fitted on a seat spring 87. When a passenger is on the seat and the seat spring 87 has depressed, the cable has moved towards the lever arm 75 whereby the lever arm has pivoted into the path of the slide under the urging of the helical compression spring 83. When the belt is extracted the slide will be locked against retraction, as described above. When the passenger unlocks one set of buckle members 46, 47 and leaves the seat, the seat spring 87 will rise and the cable 79 will be operated remotely to draw the lever arm out of the slide path, freeing the slide for retraction.

A self-locking and remotely operable seatbelt retractor according to the invention will now be described for a rear seat retractor. Referring to FIGS. 12, 13 and 14, rear seatbelt retractors, shown generally as 90, are the same for both inboard and outboard belts and are arranged on the vehicle floor beneath the rear seat 91. The belt 93 is served from the retractor between a transverse cutout in the backrest and cushion portions of the back seat. A U-shaped wire bracket 92, secured at the base of the backrest, supports the belt and retains the buckle members against retraction off the seat.

Construction and arrangement of the self-locking lever arm and the remotely operable cable are substantially the same as the front seat inboard retractor just described. For this reason, the same reference numerals have been used for corresponding elements. The belt 93 proceeds from the anchor 94 into the retractor housing 95 over the roller 96 and out the housing upwards under the roller 97 to the bracket 92 and the seat. Operation of the remotely operable cable 77 through the action of the seat spring 87 is the same as the front seat retractors.

FIG. 15 shows the bracket 92 which supports and positions the buckle members 98. The space between the bracket arms is sufficient for the belt 93 but too narrow for the buckle members. In this case, a double bracket is shown suitable for a pair of side-by-side inboard belts.

Referring to FIGS. 16 and 17, the U-shaped slotted sleeve 86 is shaped to correspond to the seat spring 87 over which it squeeze-fits to be frictionally retained.

What is claimed is:

1. A belt retractor comprising means for anchoring a portion of said belt to a rigid member, elongated retraction means cooperating with said belt to provide an extended operative position and a retracted storage position for said belt, said retraction means including slide means reciprocally slidable along said retraction means between a first position of maximum belt extraction and a second position remote therefrom and engaging said belt and biased towards said remote position to draw said belt along said retraction means into said storage position, locking means pivotable between a position of disengagement and a position for locking engagement with said belt engaging slide means when said belt-engaging slide means is moved by extraction of said belt to said first position to render said belt engaging slide means inoperative for movement towards said remote second position, said locking means having tab means extending from the side thereof, cable means having an operable end portion at one end operable from a position remote from said locking means and an actuating end portion at its other end operably connected to said tab means at a distance from the pivot axis of said locking means to pivot said locking means out of engagement with said belt-engaging slide means to release said belt-engaging slide means for retraction upon actuation of said cable means and biasing means operably connected to said locking means at a distance from its pivot axis to pivot said locking means into position for engagement with said belt-engaging slide means in the absence of said operation of said cable means, said actuating end portion of said cable and said biasing means lying substantially along said elongated retraction means.

2. A belt retractor as claimed in claim 1 wherein said cable means comprises a tensioning cable.

3. A belt retractor as claimed in claim 1 wherein said cable means comprises a compression cable.

4. A belt retractor as claimed in claim 1 wherein said cable means is operably arranged to pull upon said tab means and said biasing means is fitted between said tab means and a rigid member spaced from the pivot axis in the direction of said pull.

5. A belt retractor as claimed in claim 1 wherein said cable means is operably arranged to push upon said tab means and said biasing means is fitted between said tab means and a rigid member spaced from the pivot axis in the direction of said push.

6. A belt retractor as claimed in claim 1 wherein said cable means end remote from said locking means is actuated by a seat spring upon vacating said seat.

7. A belt retractor as claimed in claim 1 wherein said belt is served upon a seat through a bracket fastened at the base of the backrest portion of said seat, said bracket being adapted to support said belt and to stop the buckle member of said belt from being retracted from said seat.

8. A belt retractor as claimed in claim 1 wherein said cable means is connected to push upon said locking means and has a portion extending beyond the place of connection and said biasing means is helically wound about said cable means to resist said push.

9. A belt retractor as claimed in claim 1 wherein said cable means passes behind the headliner of a vehicle interior and has an actuating device at its remote end which extends into the vehicle interior at a convenient place for hand operation.

10. A belt retractor comprising means for anchoring a portion of said belt to a rigid member,
    elongated retraction means engaging with said belt, said retraction means having slide means reciprocally slidable along said retraction means between a predetermined position in response to extension of said belt to a full extended position and a second position remote therefrom and engaging said belt and biased towards said remote position to draw said belt along said retraction means into a stored condition,
    locking means comprising a locking element constructed and arranged to engage said belt-engaging slide means when the latter is moved by extraction of said belt to said predetermined position to render said belt-engaging slide means inoperative for movement towards said remote second position, said locking means having tab means extending from the side thereof, remotely operable means having an operable end portion at one end and an actuating end portion at its other end operably connected to said tab means for actuating said locking means out of engagement with said belt engaging slide means to release said belt engaging slide means for retraction, and
    means for actuating said locking means into position for engagement with said belt-engaging slide means in the absence of said operation of said remotely operable means, said actuating end portion of said remotely operable means and said actuating means lying substantially along said elongated retraction means.

11. A belt retractor as claimed in claim 10 wherein said locking means comprises pivotable means adapted to pivot into the path of said belt engaging slide means in the vicinity of said predetermined position,
    said remotely operable means comprises cable means adapted upon actuation at an end remote from said pivotable means to pivot said tab means out of said path, and
    said actuating means comprises spring means for biasing said pivotable means into said path.

12. A belt retractor as claimed in claim 10 wherein said locking means pivots at an axis normal to the path of said belt-engaging slide means.

13. A belt retractor as claimed in claim 10 wherein said remotely operable means is arranged to draw upon said locking means and said actuating means is helically wound about said remotely operable means to resist that draw.

14. A belt retractor as claimed in claim 10 wherein said belt is served upon a seat through a transverse cutout in the base of the backrest portion of said seat and holding means are secured in said cutout to retain the buckle members of said belt on said seat.

15. A belt retractor as claimed in claim 10 wherein the retractor is positioned below the floor level of vehicle in which it is used.

16. A belt retractor as claimed in claim 10 wherein the retractor is positioned behind the seat it serves and has an upwardly directed sleeve hinged at its forward end through which the belt passes.

17. A belt retractor as claimed in claim 10 wherein said remotely operable means is attached at its end remote from said locking means to a seat spring by a sleeve means which is adapted to fit over a portion of said seat spring.

18. A belt retractor as claimed in claim 17 wherein said sleeve means is U-shaped to conform to a U-shaped portion of said seat spring.

19. A belt retractor as claimed in claim 18 wherein said sleeve means is journaled in bearing means at the remote end of said remotely operable means.

20. A self-locking belt retractor comprising means for anchoring a portion of said belt to a rigid member,
    retraction means cooperating with said belt to provide an extended operative position and a retracted storage position for said belt,
    said retraction means comprising and elongated guide and a belt-engaging slide reciprocally moveable along said guide between a predetermined position in response to full extraction of said belt from said retractor and a position remote from said predetermined position,
    a lever arm pivotably secured to said guide and oriented to pivot at an axis substantially perpendicular to the movement of said slide and constructed and arranged to pivot into engagement with said slide when the latter is in said predetermined position to render said slide inoperative for movement towards said remote position, said lever arm having tab means extending from the side thereof,
    means for biasing said lever arm towards engagement with said slide and
    means having an operable end portion at one end and an actuating end portion at its other end operably connected to said tab means to apply a force substantially perpendicular to said pivot axis to pivot said lever arm out of engagement with said slide, said actuating end portion of said means and said biasing means lying substantially along said elongated guide.

* * * * *